United States Patent
Cheng et al.

(10) Patent No.: US 10,716,117 B2
(45) Date of Patent: Jul. 14, 2020

(54) METHOD, SYSTEM AND APPARATUS FOR SIGNALING STATION CAPABILITIES TO ESTABLISH WIRELESS CONNECTIONS

(71) Applicant: PERASO TECHNOLOGIES INC., Toronto (CA)

(72) Inventors: Gary Cheng, Unionville (CA); Joseph Andonieh, Aurora (CA); Bradley Robert Lynch, Toronto (CA); Christopher James Hansen, Los Altos, CA (US)

(73) Assignee: PERASO TECHNOLOGIES INC., Toronto (CA)

( * ) Notice: Subject to any disclaimer, the term of this patent is extended or adjusted under 35 U.S.C. 154(b) by 57 days.

(21) Appl. No.: 15/803,151

(22) Filed: Nov. 3, 2017

(65) Prior Publication Data

US 2018/0132224 A1    May 10, 2018

Related U.S. Application Data

(60) Provisional application No. 62/417,515, filed on Nov. 4, 2016, provisional application No. 62/457,391, filed (Continued)

(51) Int. Cl.
*H04W 4/00* (2018.01)
*H04W 72/04* (2009.01)
(Continued)

(52) U.S. Cl.
CPC .......... *H04W 72/048* (2013.01); *H04W 8/22* (2013.01); *H04W 8/24* (2013.01); *H04W 76/18* (2018.02);
(Continued)

(58) Field of Classification Search
CPC ....... H04W 72/04; H04W 8/24; H04W 76/18; H04W 72/0446; H04W 72/048; H04W 84/12; H04W 8/22
See application file for complete search history.

(56) References Cited

U.S. PATENT DOCUMENTS

| 2010/0056876 A1* | 3/2010 | Ellis | A61B 5/1038 600/300 |
| 2010/0125631 A1* | 5/2010 | Zhang | H04W 28/18 709/204 |

(Continued)

FOREIGN PATENT DOCUMENTS

WO    WO-2016175943 A1    11/2016

OTHER PUBLICATIONS

Rob Sun (Huawei): "Proposed Text for EDMG Capability and Operation Element Channel Indication", IEEE Draft; IEEE-SA Mentor, Piscataway, NJ USA, vol. 802.11ay, Mar. 14, 2017. Retrieved from the Internet: URL: https://mentor-ieee.org/802.11/dcn/17/11-17-0450-00-00ay-proposed-text-for-edmg-capability-and-operation-element-channel-indication.docx.

(Continued)

*Primary Examiner* — Abdelillah Elmejjarmi
(74) *Attorney, Agent, or Firm* — Perry + Currier

(57) ABSTRACT

A method in a first wireless station of establishing a connection with a second wireless station includes: generating a frame including a capabilities element having: a core capabilities field containing a predefined sequence of core subfields having respective predefined lengths; the core subfields containing respective first core values defining core capabilities of the first wireless station; and at least one extended capability field containing: an extended capability identifier subfield containing an identifier of one of a plurality of predefined extended capabilities; an extended capability length subfield containing an extended capability (Continued)

length value; and an extended capability payload subfield having a length equal to the extended capability length value; the payload subfield containing a first extended value defining an extended capability of the first wireless station; and responsive to generating the frame, transmitting the frame.

14 Claims, 5 Drawing Sheets

Related U.S. Application Data on Feb. 10, 2017, provisional application No. 62/463,370, filed on Feb. 24, 2017, provisional application No. 62/501,529, filed on May 4, 2017.

(51) Int. Cl.
| | | |
|---|---|---|
| *H04W 8/22* | (2009.01) | |
| *H04W 76/18* | (2018.01) | |
| *H04W 8/24* | (2009.01) | |
| *H04W 84/12* | (2009.01) | |

(52) U.S. Cl.
CPC ........ *H04W 72/0446* (2013.01); *H04W 84/12* (2013.01)

(56) References Cited

U.S. PATENT DOCUMENTS

| | | | | |
|---|---|---|---|---|
| 2010/0202354 | A1* | 8/2010 | Ho | G06Q 10/06 370/328 |
| 2011/0103314 | A1* | 5/2011 | Ahmadi | H04W 8/22 370/329 |
| 2013/0329600 | A1* | 12/2013 | Vedula | H04W 8/22 370/254 |
| 2014/0105395 | A1* | 4/2014 | Hart | H04W 12/02 380/259 |
| 2016/0007275 | A1 | 1/2016 | Park et al. | |

OTHER PUBLICATIONS

EPO, Extended European Search Report, dated Mar. 13, 2018, re European Patent Application No. 17199629.1.
"ISO/IEC/IEEE International Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2014, pp. 1-634.
Kaushik Josiam (Samsung): "Generic Control Frame for 11ay", IEEE Draft; IEEE-SA Mentor, Piscataway, NJ, USA, vol. 802.11ay, No. 1, May 17, 2016, pp. 1-12. Retrieved from the Internet: URL: https://mentor.ieee.org/802.11/dcn/16/11-16-0677-01-00ay-generic-control-frame-for-11ay-pptx [retrieved on May 17, 2016].

* cited by examiner

METHOD, SYSTEM AND APPARATUS FOR SIGNALING STATION CAPABILITIES TO ESTABLISH WIRELESS CONNECTIONS

CROSS-REFERENCE TO RELATED APPLICATIONS

This application claims priority from U.S. provisional application Nos. 62/417,515, filed Nov. 4, 2016; 62/457391, filed Feb. 10, 2017; 62/463370, filed Feb. 24, 2017; and 62/501,529, filed May 4, 2017. The content of each of the above-mentioned applications is incorporated herein by reference.

FIELD

The specification relates generally to wireless communications, and specifically to a method, system and apparatus for signaling station capabilities to establish wireless connections.

BACKGROUND

Certain wireless communications protocols, such as those in the Institute of Electrical and Electronics Engineers (IEEE) 802.11 family of standards, define a variety of features, some of which may be mandatory and others of which may be optional. In order to establish connections, wireless communications devices operating under such standards may first exchange information defining which features each device supports. The above exchange permits the devices to select parameters for a connection that are compatible with the capabilities of each device participating in the connection. In standards such as the 802.11ad standard, devices are configured to signal their capabilities in capabilities elements, which contain values for each capability available under the standard. The values indicate, for example, whether or not the device supports the relevant capability, or indicate a level of functionality corresponding to a given capability (e.g. a maximum data rate).

As wireless communication standards enable increased throughput, the standards also introduce additional complexity, for example in the form of broader feature sets, and particularly broader sets of optional features. For example, each of the 802.11b, 802.11e, 802.11n, 802.11ac and 802.11ad standards, respectively, introduced features beyond those in the preceding standards. Future enhancements to the 802.11 family of standards, such as the 802.11ay enhancement to 802.11ad, are expected to introduce yet more features to increase throughput. Consequently, the capabilities elements mentioned above have grown in length to the point where they are cumbersome to deploy in certain situations. For example, the capabilities element may be omitted from beacons in the 802.11ad standard due to its length. Such omission reduces the time required to transmit beacons, but also requires wireless devices to exchange additional frames to obtain the necessary information to establish connections with each other. Meanwhile, when the capabilities elements are included in frames exchanged between devices, the capabilities consume ever greater bandwidth.

SUMMARY

An aspect of the specification provides a method in a first wireless station of establishing a connection with a second wireless station, comprising: generating a frame including a capabilities element having: a core capabilities field containing a predefined sequence of core subfields having respective predefined lengths; the core subfields containing respective first core values defining core capabilities of the first wireless station; and at least one extended capability field containing: an extended capability identifier subfield containing an identifier of one of a plurality of predefined extended capabilities; an extended capability length subfield containing an extended capability length value; and an extended capability payload subfield having a length equal to the extended capability length value; the payload subfield containing a first extended value defining an extended capability of the first wireless station; and responsive to generating the frame, transmitting the frame.

A further aspect of the specification provides a wireless communications assembly in a first wireless station for establishing a connection with a second wireless station, comprising: a memory; and a controller connected with the memory, the controller configured to: generate a frame including a capabilities element having: a core capabilities field containing a predefined sequence of core subfields having respective predefined lengths; the core subfields containing respective first core values defining core capabilities of the first wireless station; and at least one extended capability field containing: an extended capability identifier subfield containing an identifier of one of a plurality of predefined extended capabilities; an extended capability length subfield containing an extended capability length value; and an extended capability payload subfield having a length equal to the extended capability length value; the payload subfield containing a first extended value defining an extended capability of the first wireless station; and responsive to generating the frame, transmit the frame.

BRIEF DESCRIPTIONS OF THE DRAWINGS

Embodiments are described with reference to the following figures, in which.

DETAILED DESCRIPTION

Figure 1:
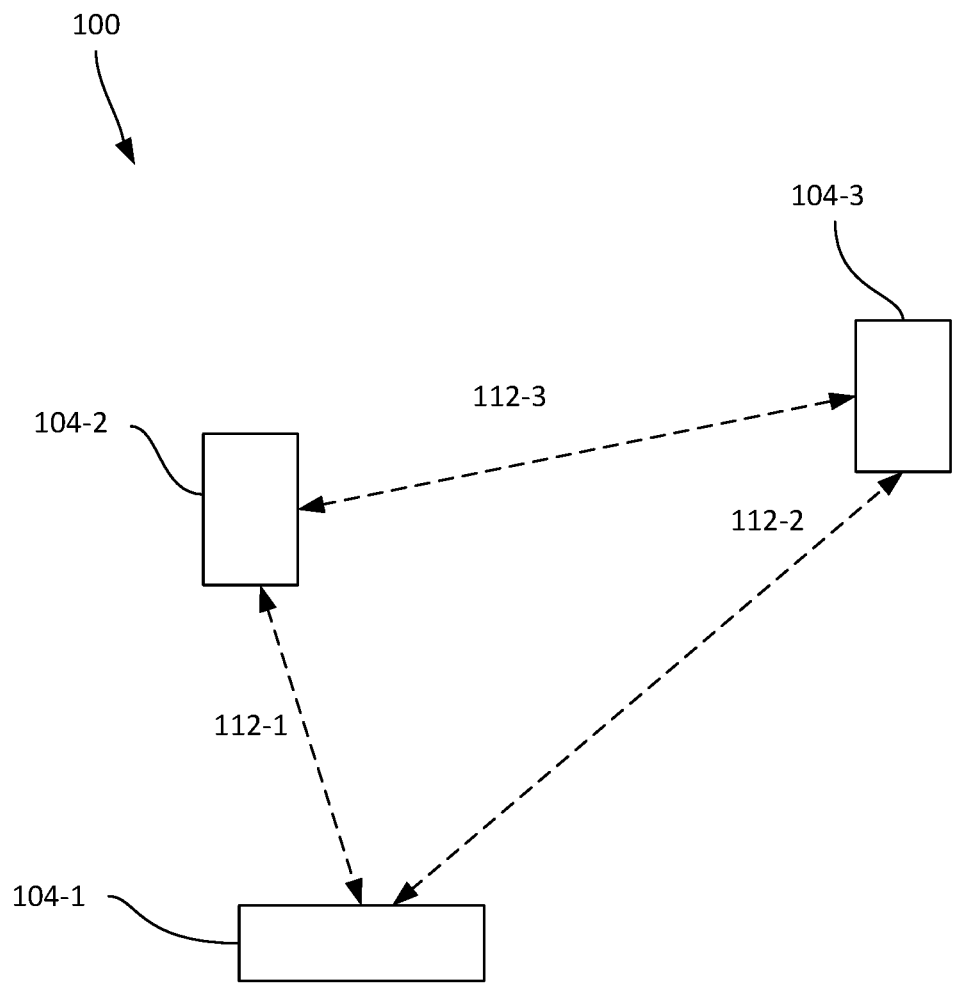
FIG. 1 depicts a wireless communications system.

FIG. 1 depicts a wireless communications system 100, including a plurality of wireless devices 104 (also referred to as stations 104). In particular, FIG. 1 illustrates a first device 104-1 in the form of (e.g., containing or implementing) an access point (AP) or PBSS control point (PCP), connected with second and third devices 104-2 and 104-3 in the form of client devices via respective wireless links 112-1 and 112-2. The access point 104-1 can be, for example, a wireless router connecting the client devices 104-2 and 104-3 to a wide area network (not shown) such as the Internet. The access point 104-1 may also be, for example, a media servers, a home computer, another client device configured as a soft access point, and the like. The client devices 104-2 and 104-3, meanwhile, can be mobile devices such as smartphones, tablet computers and the like. The client devices 104-2 and 104-3 may also be access points themselves, for example in implementations in which the access point 104-1 is a component in a backhaul infrastructure of which the client devices 104-2 and 104-3 are clients. More generally, the access point 104-1, as well as the client devices 104-2 and 104-3, can include any suitable combination of computing devices with wireless communication assemblies suitable for communicating with one another. Thus, wireless connections 112 can be established between any pair of the wireless devices 104 illustrated in FIG. 1, as well as any additional wireless devices (not shown) included in the system 100. In particular, three example connections 112-1, 112-2 and 112-3 are shown between the devices 104. As will be apparent, the connections 112 need not all be active at the same time.

In the examples discussed below the devices 104 of the system 100 each include a wireless communications assembly configured to implement a shared wireless communication standard. In the present example, the devices 104 of the system 100 are each configured to communicate according to a wireless standard selected from the IEEE 802.11 family of standards. More specifically, the devices 104 are each configured to communicate according to the 802.11ay enhancement to the 802.11ad standard, both of which employ carrier frequencies of around 60 GHz (also referred to as mmWave). As will be apparent to those skilled in the art, the discussion below may also be applied to a wide variety of other communication standards.

In order to establish a connection 112, the devices that are party to the connection 112 (e.g. the devices 104-1 and 104-2 for the connection 112-1) are configured to exchange information defining their respective capabilities. As will be seen below, each device 104 is configured to generate and transmit a frame including information defining its own capabilities, and to receive and process a frame from another device 104 including information defining the capabilities of that device. The connection 112 is established (or aborted) on the basis of compatibility between the respective capabilities of the devices 104. As will be discussed below in greater detail, each of the devices 104 is configured to signal capabilities to the other devices 104 in two distinct parts: a core set of capabilities signaled by each device 104, and an extended set of capabilities, the signaling of which may vary between the devices 112.

Figure 2:
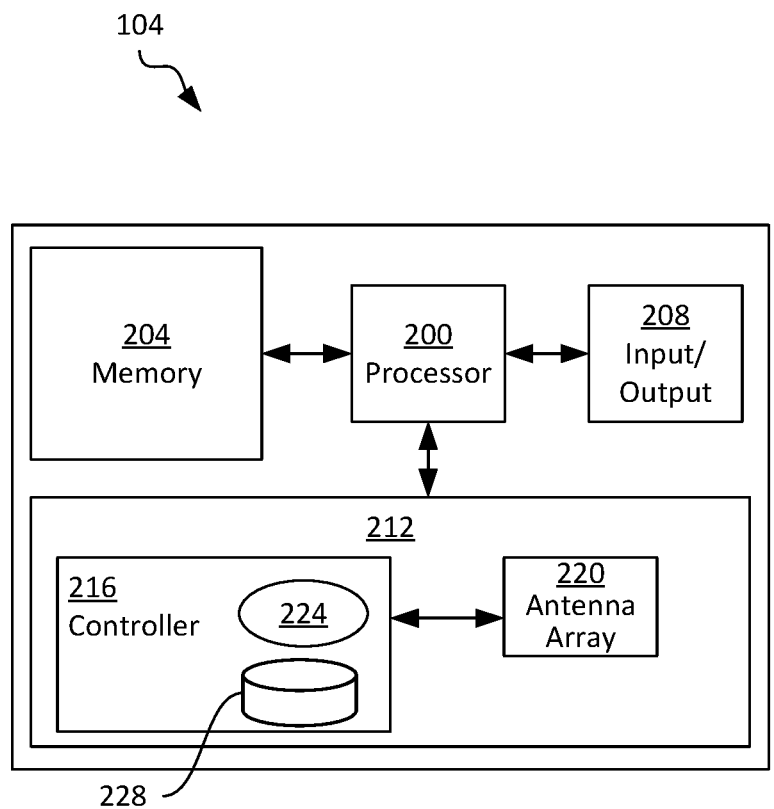
FIG. 2 depicts certain internal components of a wireless device of the system of FIG. 1.

Turning now to FIG. 2, before describing the operation of the devices 104 to implement the capability-signaling actions mentioned above, certain components of a generic device 104 will be described. As will be apparent, the description of the device 104 below also applies to each of the devices 104-1, 104-2 and 104-3. That is, the devices 104-1, 104-2 and 104-3 each include the components discussed below, though it will be understood that the particular implementation of each component may vary from device to device.

The device 104 includes a central processing unit (CPU), also referred to as a processor 200. The processor 200 is interconnected with a non-transitory computer readable storage medium, such as a memory 204, having stored thereon various computer readable instructions for performing various actions (e.g. streaming media to the device 108). The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes one or more input devices, and one or more output devices, generally indicated as an input/output device 208. The input and output devices 208 serve to receive commands for controlling the operation of the device 104 and for presenting information, e.g. to a user of the device 104. The input and output devices 208 therefore include any suitable combination of devices, including a keyboard, a mouse, a display, a touchscreen, a speaker, a microphone, cameras, sensors, and the like). In other embodiments, the input and output devices may be connected to the processor 200 via a network, or may simply be omitted.

The device 104 further includes a wireless communications assembly 212 interconnected with the processor 200. The assembly 212 enables the device 104 to communicate with other computing devices. In the present example, as noted earlier, the assembly 212 enables such communication according to the IEEE 802.11ay standard, and thus transmits and receives data at frequencies of around 60 GHz.

The communications assembly 212 includes a controller 216 in the form of one or more integrated circuits, configured to establish and maintain communications links with other devices (e.g., links 112). The controller 216 is also configured to process outgoing data for transmission via one or more antennas or antenna arrays, of which an example antenna array 220 is illustrated (e.g. a phased array of antenna elements). The controller 216 is also configured to receive incoming transmissions from the array 220 and process the transmissions for communication to the processor 200. The controller 216, in the present example, therefore includes a baseband processor and a transceiver (also referred to as a radio processor), which may be implemented as distinct hardware elements or integrated on a single circuit. In other embodiments, the device 104 may include a plurality of controllers 216 and corresponding antenna arrays 220 within the communications interface 212.

Further, the controller 216 is configured to execute various computer-readable instructions (e.g. stored in a memory element integrated with the controller 216 or implemented as a discrete hardware component of the assembly 212 and connected with the controller 216) in the form of a control application 224 for performing the above functions. The control application 224 may be implemented as a software driver deployed to the assembly 212, for example via the processor 200. Via the execution of the application 224, the controller 216 is configured to operate the wireless communications assembly 212 to establish connections with the wireless communications assemblies of other devices 104. In particular, the controller 216 is configured to generate capabilities elements containing sets of parameters defining the communications capabilities of the assembly 212 for transmission to such other devices, as well as to receive and process similar capabilities elements from other devices 104. To that end, the controller 216 also stores a repository 228 of capability parameters for use in generating the above-mentioned capabilities element.

Figure 3:
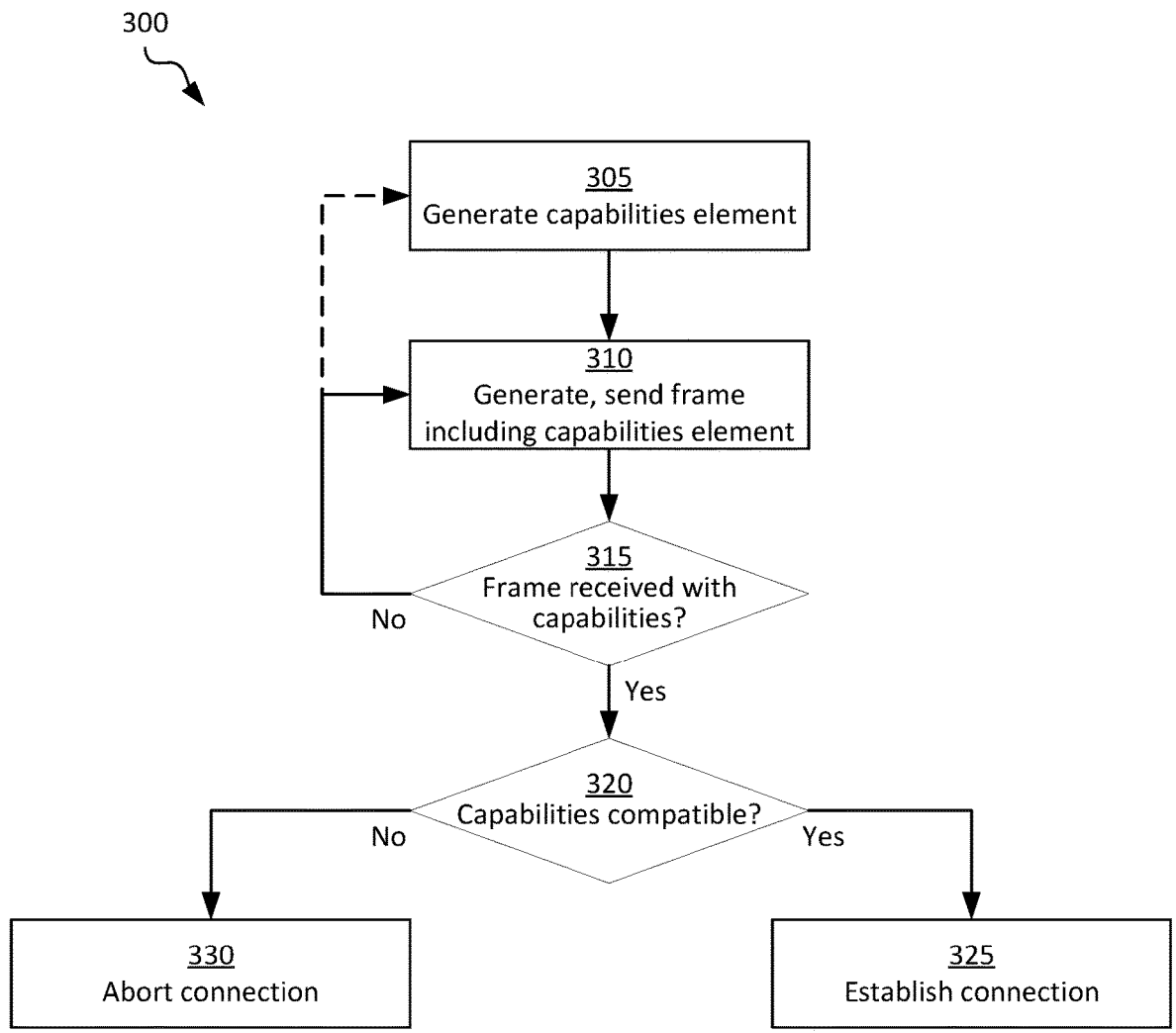
FIG. 3 depicts a method of establishing wireless connections in the system of FIG. 1.

Turning now to FIG. 3, a method 300 of establishing wireless connections, and particularly of exchanging capability information to enable such establishment, is depicted. The method 300 will be described in connection with its performance on a device 104 as illustrated in FIG. 2. The blocks of the method 300 are performed by the controller 216 of the communications interface 212, via the execution of the application 224.

At block 305, the device 104 is configured to generate a capabilities element for inclusion in a frame to be transmitted via the antenna array 220. The generation of the capabilities element will be described below in greater detail. In brief, the capabilities element includes two portions. The first portion consists of a core capabilities field, while the second portion, which is typically appended to the first portion (i.e. appears after the first portion), consists of one or more extended capabilities fields. Together, the core capabilities field and the extended capabilities field(s) define the capabilities of the device 104. Of note, however, is that while each device 104 employs the same format for the core capabilities field—that is, the core capabilities field generated by every device 104 conveys parameters for the same set of—each device 104 may generate a different set of extended capabilities fields. That is, each device 104 may generate a set of extended capabilities fields conveying parameters for a different subset of the overall set of capabilities defined by the relevant standard (e.g., 802.11ay).

Figure 4:
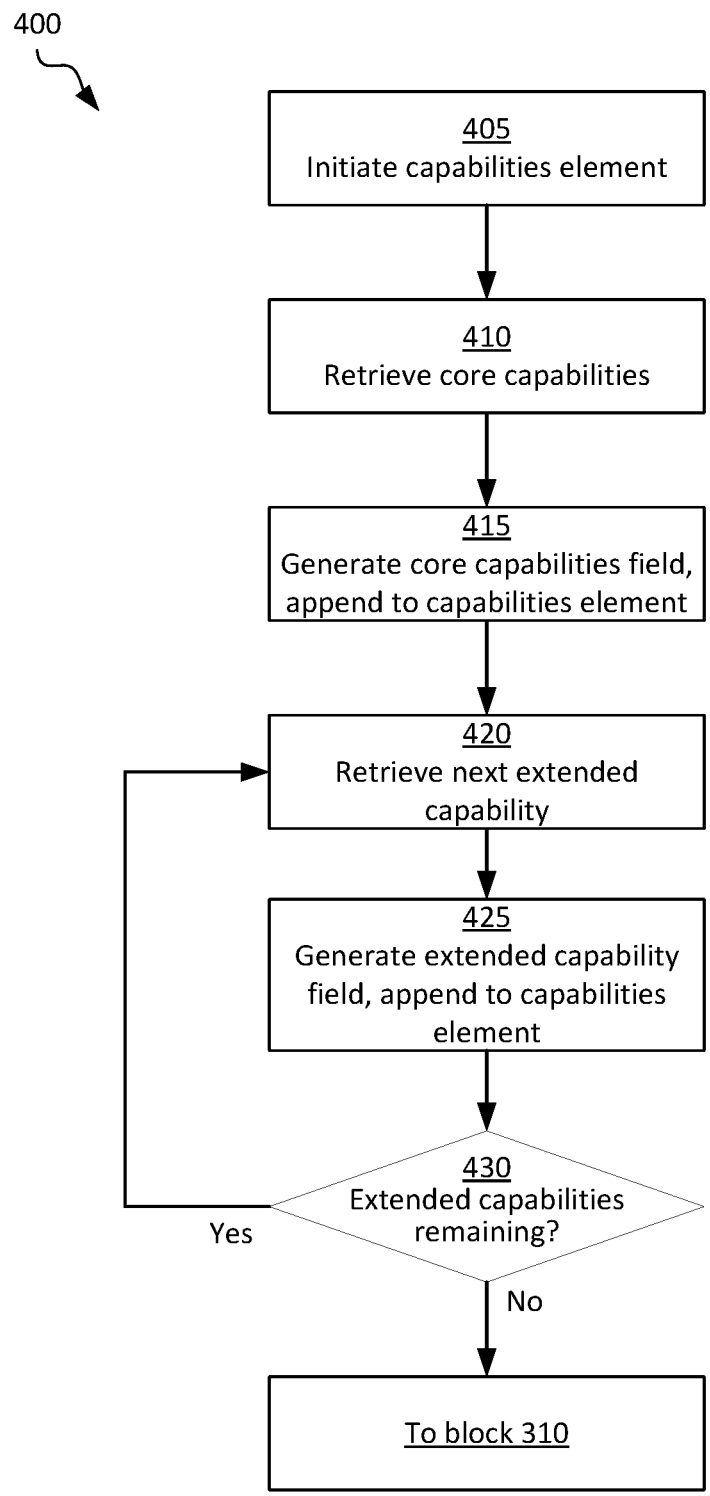
FIG. 4 depicts a method of generating a capabilities element for use in the method of FIG. 3.
Figure 5A:
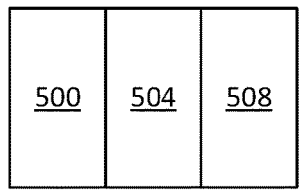
FIGS. 5A-5D depict the formation of the capabilities element according to the method of FIG. 4.

Turning to FIG. 4, a method 400 of generating a capabilities element (i.e., of performing block 305 of the method 300) is illustrated. At block 405, the controller 216 is configured to initiate the capabilities element. In the present example, in which the controller 216 is configured to implement the 802.11ay standard, as shown in FIG. 5A the performance of block 405 includes the generation of at least an element identifier field 500, a length field 504, and an element identifier extension field 508 (e.g. each having a length of one octet). As will be apparent to those skilled in the art, the element identifier field 500 indicates that the element following the field 500 is a capabilities element. As will further be apparent, the length field 504 indicates the total length of the capabilities element. In other embodiments, one or more of the above-mentioned fields may be omitted. For example, the element identifier extension field 508 may be omitted in some embodiments. Further, the length field 504 may also be omitted in some embodiments; as will be discussed below, the core capabilities field has a fixed length (i.e. its length is known to the devices 104), and the extended capabilities fields indicate their lengths.

The controller 216 may also be configured to assign values to the above-mentioned fields according to any suitable mechanism at block 405. The values assigned to the identifier field 500 and the extension identifier field 508, for example, may be fixed values specified by the relevant wireless communications standard and stored in the repository 228. At block 405, a value is not yet assigned to the length field 504, as the remainder of the capabilities element has not yet been generated, and the total length of the capabilities element may therefore not be known. In some embodiments, however, the repository 228 may include an indication of the length of the capabilities element; in such embodiments the length field 504 is populated with that indication. Specifically, the capabilities of a given assembly 212 may be fixed. In such embodiments, the capabilities element generated by the controller 216 may be identical for each performance of block 305 (that is, for each performance of the method 400). For example, the controller 216 may be configured to generate the same capabilities element for every type of frame the capabilities element is to be included in. In such embodiments, the length of the capabilities element is known in advance, and may be stored in the repository 228.

Returning to FIG. 4, at block 410 the controller 216 is configured to retrieve core capability parameters from the repository 228. The repository 228 contains, for each of a predefined set of core capabilities, a value (typically, but not necessarily, a binary string) that defines the corresponding core capability. Table 1, below, illustrates an example set of core capabilities and corresponding values.

TABLE 1

| Core Capabilities | |
|---|---|
| Core Capability | Value |
| A-MPDU Parameters | 0100110 |
| TRN Parameters | 111111111111 |
| Supported MCS | 11 |

As seen above, the predefined set of core capabilities maintained in the repository 228 includes a value defining MAC protocol data unit (MPDU) aggregation parameters, as well as a value defining training (TRN) parameters and a value defining supported modulation and coding scheme (MCS) parameters. In the example shown above, the first four bits of the value corresponding to the A-MPDU parameters capability indicate a maximum A-MPDU length exponent (i.e. four, in the present example), and the final three bits indicate a minimum MPDU start spacing time interval. In the present example, the value 5 indicated above corresponds to a minimum start spacing of 128 ns. The repository 228 may contain other records providing definitions for the above values, or such definitions may simply be included in the instructions of the application 224.

The value corresponding to the TRN parameters capability, in the present example, includes twelve bits. The first five bits indicate whether the device 104 is capable of transmitting protocol data units with various training parameters (EDMG_TRN_P and EDMG_TRN_N, in particular) values; the next five bits indicate whether the device 104 is capable of receiving protocol data units with the above-mentioned training parameters. The final two bits indicate whether or not the device 104 is capable of receiving TRN subfields based on different types of complementary sequences (e.g. short and long Golay sequences).

The value corresponding to the supported MCS capability, in the present example, includes a first bit indicating whether the device 104 supports transmission of protocol data units using non-uniform constellation (NUC), and a second bit indicating whether the device 104 supports reception of protocol data units using non-uniform constellation (NUC).

As will be apparent to those skilled in the art, the specific values for the capabilities mentioned above may vary between devices 104. Further, the length and format of the above-mentioned values need not be exactly as described above. Each device 104 in the system 100, however, includes values for the same predefined set of core capabilities, and although the values may differ, their length and formatting (e.g. which bits indicate which parameters) is common across all devices 104.

Figure 5B:
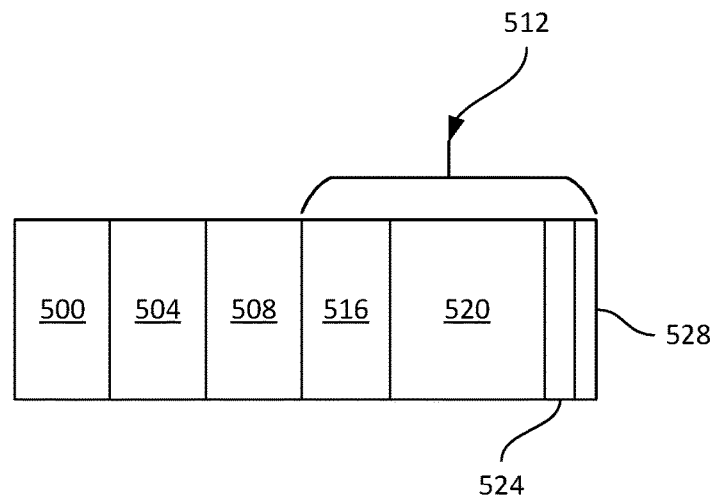

Having retrieved the core capabilities from the repository 228, at block 415 the controller 216 is configured to generate a core capabilities field and append the core capabilities field to the capabilities element initiated at block 405. Turning to FIG. 5B, a core capabilities field 512 is shown appended to the capabilities element (i.e. following the element identifier extension field 508). The core capabilities field 512 includes a predefined sequence of core subfields having respective predefined lengths. The order of the subfields in the sequence can be defined by the order in which the capabilities appear in the repository (e.g. as shown in Table 1). In other embodiments, each core capability in the repository 228 can include a sequencing indicator explicitly defining its position in the core capabilities field 512. Each core subfield contains a value (having the above-mentioned predefined length) defining a corresponding core capability. Thus, in the present example, the core capabilities field 512 includes an A-MPDU subfield 516 with a length of seven bits, followed by a TRN parameters subfield 520 with a length of twelve bits, followed in turn by a support MCS subfield 524 with a length of two bits. In the example shown in FIG. 5B, the core capabilities field 512 ends with a reserved subfield 528 having a length of three bits, bringing the total length of the core capabilities field 512 to three octets. The subfield 528 may be omitted or extended in other examples.

As noted above, the order and length of the subfields in the core capabilities field 512 need not be as described herein. Indeed, a wide variety of other formats may be employed to convey the above capabilities. Further, the core capabilities field 512 need not encode the specific capabilities described above. Of note, however, is that each device 104 in the system 100 generates a core capabilities field containing values of the same length, in the same sequence of subfields. Therefore, the core capabilities field contains no explicit indication of subfield or field length, and also contains no field or subfield identifier, because the format of the core capabilities field 512 is predefined and shared amongst all devices 104.

Returning to FIG. 4, having generated the core capabilities field 512, the controller 216 is configured to proceed to block 420. At block 420, the controller 216 is configured to retrieve an extended capability from the repository 228. As with the core capabilities, the repository 228 contains, for each of one or more extended capabilities, a value (typically, but not necessarily, a binary string) that defines the corresponding extended capability. In contrast to the core capabilities, however, the repository 228 may contain values for only a subset of the complete set of extended capabilities defined by the wireless communication standard under which the devices 104 operate. That is, while every device 104 stores a value for every core capability, each device 104 may store values for only a subset of the extended capabilities. Indeed, certain devices 104 may not store any values for extended capabilities, while other devices 104 may store values for every available extended capability. Table 2, below, illustrates an example set of extended capabilities and corresponding values.

TABLE 2

Extended Capabilities

| Capability | Capability ID | Payload Length (bits) | Value |
|---|---|---|---|
| Beamforming | 0 | 16 | 0101111100000000 |
| Antenna Polarization | 1 | 32 | $[O_0][O_{11}, O_{12}] \ldots [O_{N1}, O_{N2}]$ |
| PHY | 2 | 16 | 1110011010010000 |
| Supported Channels | 3 | 208 | $[O_1\text{-}O_{N+1}], [O_{N+2}\text{-}O_{N+2M+2}]$ |

As seen above, each extended capability record in the repository 228 includes, in addition to a value for the capability, a capability identifier and a payload length (i.e. the length of the value defining that capability). In some embodiments, the payload length is not stored explicitly in the repository 228, but is instead determined during generation of the corresponding extended capability field. The lengths of the extended capability values need not be fixed. That is, two devices 104 can store values for the same extended capability (e.g. antenna polarization), and the two values may have different lengths (e.g., depending on the number of antennas 220 present in each device 104).

In the example shown above, values for four extended capabilities are shown as being stored in the repository 228. In particular, a value defining beamforming parameters includes subsets of bits indicating, for example, whether various multiple-input, multiple-output (MIMO) protocols are supported by the device (e.g., multiple-user MIMO, single-user MIMO and the like). The beamforming extended capability value may also define other beamforming parameters. The antenna polarization extended capability value includes a first octet ($O_0$ in Table 2) indicating a number of antennas present in the assembly 212, and a number of subsequent octet pairs $O_{11}$, $O_{12}$ to $O_{N1}$, $O_{N2}$ each defining polarization parameters for each antenna 220. The polarization parameters may include parameters indicating whether any one or more of single polarization, polarization switching, synthesizable polarization and the like, are supported by the corresponding antenna 220.

The extended capabilities also include a PHY value including a plurality of bits indicating whether various transmission and reception modes, modulation mechanisms, and the like, are supported by the assembly 212 (e.g., phase hopping, spread quadrature phase-shift keying (SQPSK), etc.). The PHY value may also include bits indicating a maximum number of MIMO spatial streams supported, maximum MCS supported per stream for various levels of channel bonding, a maximum total PHY data rate, and the like. The supported channels extended capabilities value may include a first set of octets defining which channels are supported by the assembly 212 (e.g., N+1 octets, where N is the number of channels), and a second set of octets defining channel aggregations supported by the assembly (e.g., 2M+1 octets, where M is the number of channel aggregation combinations supported by the assembly 212).

As will be apparent to those skilled in the art, the values assigned to each extended capability may vary between devices 104. Further, in other embodiments, different formats may be employed by the devices 104 for each extended capability than those described above. Still further, in other embodiments additional extended capabilities may be provided, or fewer extended capabilities may be provided.

At block 420, therefore, the controller 216 is configured to retrieve one of the extended capabilities from the repository 228. At block 425, the controller 216 is configured to generate an extended capability field containing three subfields: an identifier field having a predefined, fixed length (i.e. a length employed by all devices 104 in the system 100 for extended capability identification); a length subfield having a predefined, fixed length and containing a payload length value; and a payload subfield having a length equal to the value contained in the length subfield, and containing the value defining the corresponding extended capability.

Figure 5C:
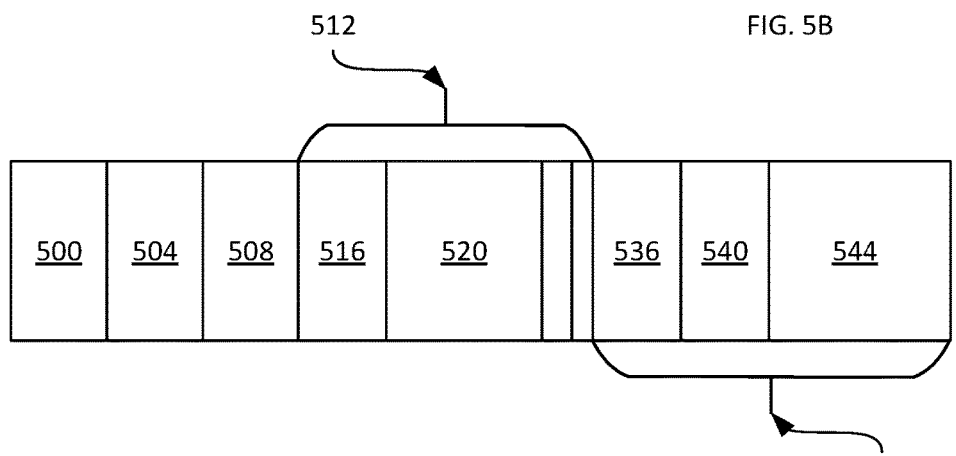

Referring to FIG. 5C, a first extended capability field 532-1 is shown appended to the core capabilities field 512, including an identifier subfield 536 (e.g., with a fixed, predefined length of one octet), a payload length subfield 540 (e.g., also with a fixed, predefined length of one octet), and a payload subfield 544.

Figure 5D:
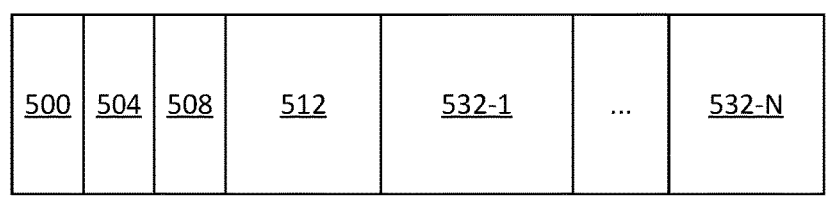

At block 430, the controller 216 is configured to determine whether any extended capabilities remain in the repository for which an extended capability field 532 has not yet been created. When the determination at block 430 is affirmative, the controller 216 is configured to repeat the performance of blocks 420 and 425 for another extended capability in the repository. FIG. 5D depicts the capabilities element of FIGS. 5A-5C with one or more additional extended capabilities fields 532-2, . . . , 532-N appended to the extended capabilities field 532-1.

When the determination at block 430 is negative, indicating that an extended capability field 532 has been created for every extended capability in the repository 228, the performance of the method 400 concludes and the controller 216 proceeds to block 310 of the method 300. In some embodiments, prior to proceeding to block 310, the controller 216 is also configured to update the length field 504 with the total length of the capabilities element.

Returning to FIG. 3, at block 310, the controller 216 is configured to generate a frame including the capabilities element generated at block 305, and transmit the frame. The frame generated at block 310 can be any of a variety of frame types (e.g., beacon, probe request, probe response, association request, association response, information request, information response, and the like), and the content of the frame therefore varies accordingly. The frame may therefore include any of a variety of additional elements, including header data (e.g. addressing information), timing information (e.g. for beacon frames), payload data, and the like.

At block 315 the controller 216 is configured to determine whether a frame containing capability information for another device 104 has been received. The frame received at block 315 may be of the same type as the frame transmitted at block 310, or may be of a different type. When the determination at block 315 is negative, the controller 216 is configured to return to one of blocks 305 and 310. That is, the controller 216 may be configured to continue waiting for a received frame, or to generate and send a subsequent frame, for example after a preconfigured time interval has elapsed.

When the determination block 315 is affirmative, the controller 216 is configured to determine, at block 320, whether the capabilities indicated in the received frame are compatible with those of the assembly 212 (that is, those indicated in the frame sent at block 310). The nature of the determination at block 320 is not particularly limited. For example, the controller 216 can be configured to extract both the core capabilities of the other device and any extended capabilities of the other device from the received frame. As will now be apparent, the core capabilities may be extracted by the controller 216 as a result of their known (i.e. predefined) position and length in the capabilities element of the frame. The extended capabilities, meanwhile, may be extracted with reference to the identifier and length subfields of each extended capability field 532 in the received frame.

As will now be apparent, the extended capabilities extracted from the received frame may not include values for the same subset of extended capabilities defined in the repository (and included in the frame sent at block 310). The controller 216 can be configured to compare each extracted capability identifier to the repository, and to discard any extended capability field 532 that does not include a capability identifier appearing in the repository 228 (because the receiving device 104 does not support the corresponding extended capability).

Following the extraction of core and extended capabilities from the received frame, the controller 216 is configured to determine, for example, whether at least a required subset of the core and extended capabilities match (e.g., whether both devices 104 support at least one common transmission mode). Various mechanisms for the assessment of capabilities and selection of features to enable for a connection 112 will be apparent to those skilled in the art. When the determination at block 320 is affirmative, the controller 216 proceeds to establish a connection 112 with the device from which the frame received at block 315 originated. When the determination at block 320 is negative, however, the establishment of the connection may be aborted at block 330.

As discussed above, therefore, each device 104 in the system 100 is configured to generate capabilities elements for inclusion in frames that indicate core capabilities in a fixed format shared amongst all devices 104, and that indicate extended capabilities in an extensible format permitting each device 104 to support a different subset of the set of extended capabilities provided under the relevant wireless communication standard. As will be apparent, the subsets of extended capabilities supported by the devices 104 may overlap, or may be entirely distinct.

The assignment of certain capabilities to the core field 512 and others to extended fields 532 need not be limited to the examples discussed above. For example, in other embodiments capabilities placed in the core field 512 above may instead be placed in an extended field 532, while capabilities placed in an extended field 532 above may instead be placed in the core field 512. The division between core and extended fields 512 and 532 is selected to balance completeness of information against the overall length of the capabilities element. In some embodiments, core capabilities may be those for which every device 104 has a value (though the values themselves may be different), while extended capabilities may be those for which at least some devices 104 have no values (i.e. do not support to any degree).

In further embodiments, capabilities may be placed in extended fields 532 although all devices 104 are expected to have values for those capabilities. For example, core capabilities may be limited to the minimum capabilities that must be exchanged between devices 104 to establish a connection (e.g. a connection employing default minimum parameters), which extended capability fields 532 may be employed to convey parameters that enable connections with greater throughput.

Variations to the above methods are contemplated. For example, in some embodiments the controller 216 can be configured select only a subset of the extended capabilities in the repository 228 for inclusion in the capabilities element. Such selection may be based on the type of frame to be generated; for example, for a beacon frame the controller 216 may be configured to select only beamforming and PHY extended capability values for generation of extended capability fields 532, whether or not other extended capability values are present in the repository 228. For example, each extended capability in the repository may include one or more frame type indicators, indicating which frame types the corresponding capability is to be included in.

In other embodiments, the format of the core field 512, a selected set of extended capabilities fields 532, or both, may be altered for greater compression. For example, the repository 228 can be configured to generate a hash value having a predetermined length (e.g. via the application of a hash function such as a cyclic redundancy check (CRC) function, SHA-1, and the like) from the core field 512 and the extended fields 532. The capabilities element may then be generated to include the hash value instead of the fields 512 and 532. Each device 104 is also configured, in such embodiments, to store a table of hash values and corresponding capabilities (e.g. both core and extended) for common combinations of capabilities. Upon receiving a frame, therefore, a given controller 216 extracts the hash value therefrom and retrieves the corresponding capabilities via a table lookup. In other embodiments, the above mechanism can be implemented separately for core and extended capabilities (e.g. a capabilities element may include a hash value for a set of extended capabilities following the field 512).

Those skilled in the art will appreciate that in some embodiments, the functionality of the application 224 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method in a first wireless station of establishing a connection with a second wireless station, comprising:
　generating a frame including a capabilities element having:
　　a capabilities element length field appended to a capabilities identifier field, the capabilities element length field containing an element length value indicating the length of the capabilities element;
　　a core capabilities field having a fixed length, the core capabilities field appended after the capabilities element length field and containing a predefined sequence of core subfields having respective predefined lengths; the core subfields containing respective first core values defining core capabilities of the first wireless station; and
　　at least one extended capability field having a variable length, the at least one extended capability field containing:
　　　an extended capability identifier subfield containing an identifier of one of a plurality of predefined extended capabilities;
　　　an extended capability length subfield containing an extended capability length value; and
　　　an extended capability payload subfield having a length equal to the extended capability length value; the payload subfield containing a first extended value defining an extended capability of the first wireless station; and
　responsive to generating the frame, transmitting the frame.

2. The method of claim 1, wherein the frame includes one of a beacon frame, a probe request frame, a probe response frame, an information request frame, an information response frame, an association request frame, and an association response frame.

3. The method of claim 1, wherein the frame includes:
　the capabilities element; and one or more of a header element and a payload element.

4. The method of claim 1, further comprising: storing the identifier of the one of the extended capabilities and the first extended value in a memory; generating the at least one extended capability field by: retrieving the extended capability identifier from the memory for placement in the extended capability identifier subfield; and retrieving the first extended value from the memory for placement in the extended capability payload subfield.

5. The method of claim 4, further comprising:
　storing the extended capability length value in the memory; and
　wherein generating the at least one extended capability field further comprises:
　　retrieving the extended capability length value from the memory for placement in the extended capability length subfield.

6. The method of claim 1, wherein generating the frame further comprises:
　generating the capabilities identifier field containing an identifier of the capabilities element; and appending the core capabilities field after the capabilities identifier field.

7. The method of claim 1, further comprising:
　receiving, from the second station, a second frame including at least a second core capabilities field containing the predefined sequence of core subfields having respective predefined lengths; the core subfields containing respective second core values defining core capabilities of the second wireless station.

8. A wireless communications assembly in a first wireless station for establishing a connection with a second wireless station, comprising:
　a memory; and
　a controller connected with the memory, the controller configured to:
　　generate a frame including a capabilities element having:
　　　a capabilities element length field appended to a capabilities identifier field, the capabilities element length field containing an element length value indicating the length of the capabilities element;
　　　a core capabilities field having a fixed length, the core capabilities field appended after the capabilities element length field and containing a predefined sequence of core subfields having respective predefined lengths; the core subfields containing respective first core values defining core capabilities of the first wireless station; and
　　　at least one extended capability field having a variable length, the at least one extended capability field containing:
　　　　an extended capability identifier subfield containing an identifier of one of a plurality of predefined extended capabilities;
　　　　an extended capability length subfield containing an extended capability length value; and
　　　　an extended capability payload subfield having a length equal to the extended capability length value; the payload subfield containing a first extended value defining an extended capability of the first wireless station; and
　　responsive to generating the frame, transmit the frame.

9. The wireless communications assembly of claim 8, wherein the frame includes one of a beacon frame, a probe request frame, a probe response frame, an association request frame, and an association response frame.

10. The wireless communications assembly of claim 8, wherein the frame includes:
　the capabilities element; and
　one or more of a header element and a payload element.

11. The wireless communications assembly of claim 8, the memory storing the identifier of the one of the extended capabilities and the first extended value;
　the controller further configured to generate the at least one extended capability field by:
　　retrieving the extended capability identifier from the memory for placement in the extended capability identifier subfield; and retrieving the first extended value from the memory for placement in the extended capability payload subfield.

12. The wireless communications assembly of claim 11, the memory storing the extended capability length value; the controller further configured to generate the at least one extended capability field further by:
retrieving the extended capability length value from the memory for placement in the extended capability length subfield.

13. The wireless communications assembly of claim 8, the controller further configured to generate the frame by:
generating the capabilities identifier field containing an identifier of the capabilities element; and
appending the core capabilities field after the capabilities identifier field.

14. The wireless communications assembly of claim 8, the controller further configured to:
receive, from the second station, a second frame including at least a second core capabilities field containing the predefined sequence of core subfields having respective predefined lengths; the core subfields containing respective second core values defining core capabilities of the second wireless station.

* * * * *